United States Patent
Raghavan et al.

(12)

(10) Patent No.: US 6,783,785 B1
(45) Date of Patent: Aug. 31, 2004

(54) READY-TO-DILUTE SUGARCANE JUICE BEVERAGE POWDER AND A PROCESS FOR PREPARING THE SAME

(75) Inventors: Bashyam Raghavan, Mysore (IN); Kulathooran Ramalakshmi, Mysore (IN); Babasaheb Bhaskarrao Borse, Mysore (IN); Mysore Nagarajarao Ramesh, Mysore (IN); Vishweshwaraiah Prakash, Mysore (IN)

(73) Assignee: Council of Scientific and Industrial Research, New Delhi (IN)

( * ) Notice: Subject to any disclaimer, the term of this patent is extended or adjusted under 35 U.S.C. 154(b) by 294 days.

(21) Appl. No.: 10/106,270

(22) Filed: Mar. 25, 2002

(51) Int. Cl.[7] .............................. A23L 2/04; A23L 2/10
(52) U.S. Cl. ....................................... 426/489; 426/599
(58) Field of Search .................... 127/42, 43; 426/489, 426/590, 599, 655

(56) References Cited

U.S. PATENT DOCUMENTS 5,270,071 A * 12/1993 Sharp et al. ................ 426/577
6,068,869 A * 5/2000 Bent Ginslov .............. 426/262
6,251,463 B1 * 6/2001 Rossy et al. ................ 426/533

FOREIGN PATENT DOCUMENTS

| DE | 3232693 | * | 7/1983 |
| FR | 2609043 | * | 7/1988 |
| JP | 60102162 | * | 6/1985 |
| JP | 63207363 | * | 8/1988 |
| JP | 04131042 | * | 5/1992 |

OTHER PUBLICATIONS

Bhupinder et al. "Studies on the development and storage stability of ready-to-serve bottled sugarcane juice". Intern. J. Trop. Agric.; vol. IX, No. 2, pp. 128–134. Jun. 1991.*

* cited by examiner

*Primary Examiner*—Keith Hendricks
(74) *Attorney, Agent, or Firm*—McDonnell Boehnen Hulbert & Berghoff

(57) ABSTRACT

The present invention relates to a ready-to-dilute sugarcane juice beverage powder and a process for preparing the same and more particularly, the present invention describes a ready-to-dilute sugarcane juice beverage powder containing 80 to 95% by wt. dry sugarcane juice, 5 to 15% by wt. acacia pulvis, 0.01 to 0.10% by wt. of a heteropolysaccharide, 1–2% by wt. of one more anti-caking agents and 0.1 to 0.5% by wt of food preservatives and optionally 0.05 to 0.5% by wt. sodium alginate and a process for the same using a vacuum shelf dryer.

18 Claims, 1 Drawing Sheet

Figure 1:
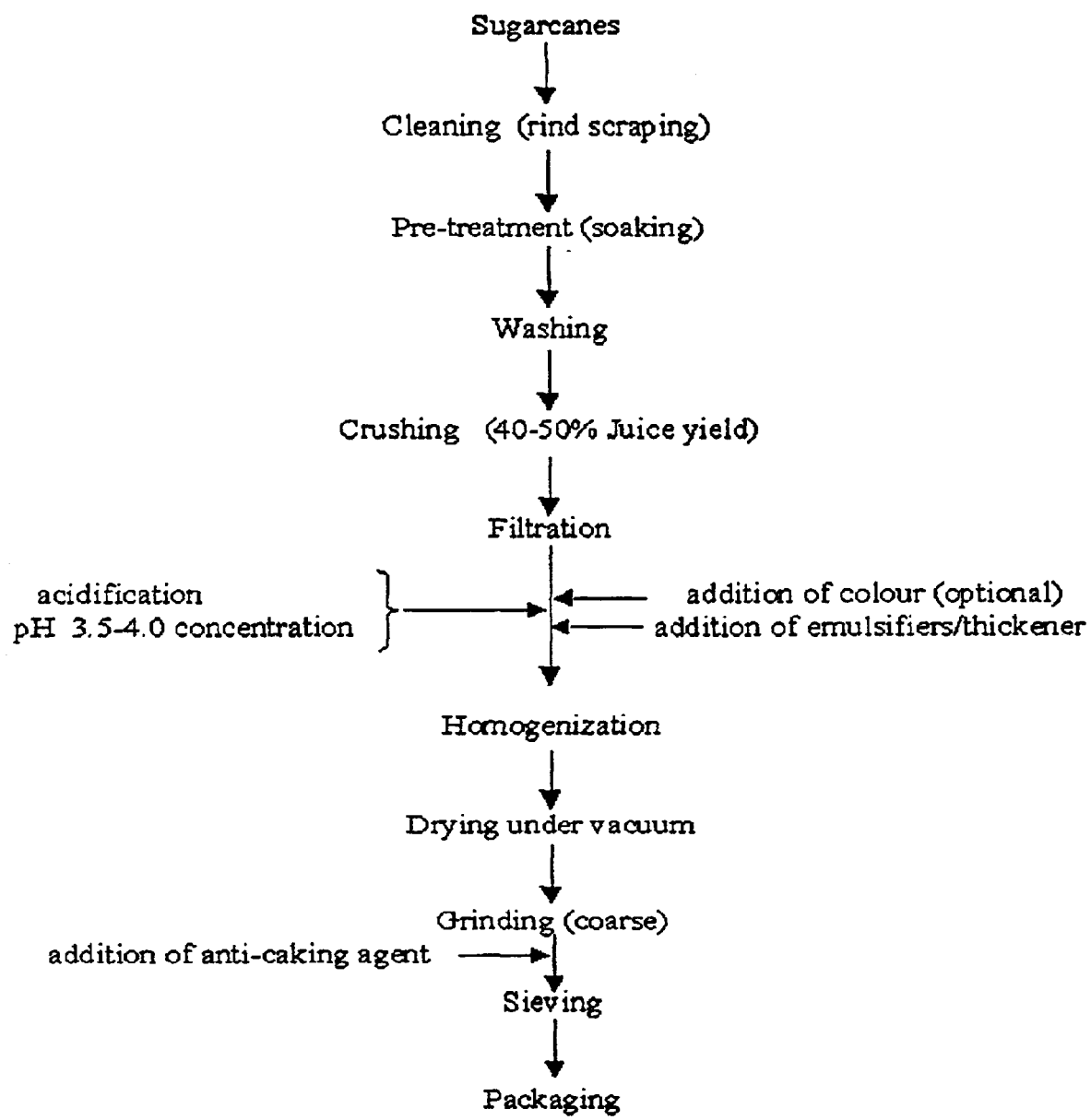

READY-TO-DILUTE SUGARCANE JUICE BEVERAGE POWDER AND A PROCESS FOR PREPARING THE SAME

FIELD OF THE INVENTION

The present invention relates to a ready-to-dilute sugarcane juice beverage powder. The present invention also provides a process for preparing ready-to-dilute sugarcane juice beverage powder. More particularly, the present invention describes a process for preparing ready-to-dilute sugarcane juice beverage powder using a vacuum shelf dryer.

BACKGROUND AND PRIOR ART OF THE INVENTION

The sugarcane contains 18–20% soluble solids and is reported to impart health benefits to the consumers. The juice, obtained on crushing the canes, with its delicate aroma is a popular beverage with the consumers. It can be an ideal replacement for synthetically flavoured beverages/soft drinks.

India has been known as the original home of sugarcane and the second largest producer next to Brazil. Presently, India produces about 280 million tonnes of sugarcane in an area of 4 million hectares. Of this, about 46% goes for the manufacture of white crystal sugar and around 42% for gurl khandsari production. The remaining quantity is available for the manufacture of sugarcane juice.

It is a well known fact that sugarcanes are crushed to obtain the juice and it is a common practice in India to dispense this juice fresh either as such or with the addition of lime juice and/or fresh ginger extract in glasses by the vendors to the consumers. The major problem encountered in this operation is the lack of hygiene resulting in contamination of the juice with the heavy load of micro-organisms which arises due to improper cleaning of the sugarcanes and handling of the finished product. Raw sugarcane juice is a carbohydrate rich, low acid food and is therefore susceptible to the growth of yeasts, of spoilage bacteria and also of pathogenic bacteria. Pathogens such as *Salmonella, S.aureus* and *C. perfringens* are able to grow and proliferate at a pH of more than 4.6. Contamination of raw juice by these bacteria can occur by the food handlers, by the equipment used or by the environment in which it is prepared. Such freshly crushed juice cannot be preserved even for a few hours since it is known to ferment very quickly.

Attempts have been made by many to develop processes for preserving the sugarcane juice in liquid form. However, there is no knowledge/information regarding its preparation as a powder. There are a few patents relating to the preparation of fruit juices in powder form but none of them relate to sugarcane juice.

Reference may be made to a process for the preparation of powdery fiuit juice in which a fruit juice, lemon or orange, is mixed with palatinose and the resultant mixture is dried and powdered by the conventional method such as spray drying with hot air or freeze vacuum drying (Shimizu Junichi, Kaga Toshio, Mizutani Takeo and Mitsui Seito, JP1983000179309, May 1984). The drawback of this process is that the powder may lose the delicate flavour due to hot air, may stick to dryer surface during spray drying and also the process may not be economical due to high energy input and longer process duration.

Reference may also be made to the preparation of a powdery health beverage wherein a fruit juice such as apple, grape or tangerine orange, is blended with an extract essence of *Flammulina velutipes* Sing., frozen at −30 C. for 10 hr and subjected to dehydration treatment at 30 C. for 8 hr and 50 C. for 12 hr in a vacuum dryer to provide a solid material which is subsequently powdered (Nomoto Masao and Nomoto Masao, JP1987000086465, October 1988). The drawback of this process is enormous time required, namely, 30 hrs and an expensive freezing step which may lead to low productivity and higher cost of the final product.

One more reference may be made to a method of drying sugar-containing materials in which fruit juices such as apple and grape juice and syrups such as honey are blended with a corn syrup solid having a dextrose equivalent of 45 or below or lactose and freeze dried (Stern Robert, M. and Storrs Arnold, B., U.S. Pat. No. 3,483,032, December 1969). Herein too the major drawback is the high cost of freeze drying process.

Another reference may be made to a method for the production of dried fruit juice by freeze drying of cut fruit and later ground to a powder state (Gazin M. Ju and Shaposhnikova, G. I., RU2136182C1, September 1999). Again the drawback of this process lies in expensive freeze-drying step.

Further reference may be made to a process (Akahori Kozo and Hitosugi Hidenari, JP62179370A2, August 1987) for the production of granular instant drink by dripping fruit juice containing 40–70% water on raw material such as sugar powder and then drying the wet granules with hot air (40–80° C.). The disadvantage of this process may be the loss of granular structure the moment fruit juice comes in contact with powdered sugar.

Reference may also be made to a report (Nigam and Raha, 1982, Proceeding of 37$^{th}$ Annual Convention of Sugar Technologists Association of India, pp.206–215) regarding spray drying of sugarcane juice, but the information is incomplete and a person skilled in the art will not be able to obtain a sugarcane juice beverage powder which is commercially viable, safe to drink and possible to manufacture at reasonably less economic value by following the report.

OBJECTS OF THE INVENTION

The main object of the present invention is to provide a ready-to-dilute sugarcane juice beverage powder.

Another object of the present invention is to provide a process for preparing ready-to-dilute sugarcane juice beverage powder.

Yet another object of the present invention is to provide a process for preparing ready-to-dilute sugarcane juice beverage powder using a vacuum shelf dryer.

DETAILED DESCRIPTION OF THE PRESENT INVENTION

Accordingly, the present invention provides a ready-to-dilute sugarcane juice beverage powder containing 80 to 95% by wt. dry sugarcane juice, 5 to 15% by wt. acacia pulvis, 0.01 to 0.10% by wt. of a heteropolysaccharide, 1–2% by wt. of one more anti-caking agents and 0.1 to 0.5% by wt of food preservatives and optionally 0.05 to 0.5% by wt. sodium alginate.

In an embodiment of the present invention, said beverage powder contains 0.03 to 0.07% by wt. of heteropolysaccharide.

In another embodiment of the present invention, said beverage powder contains 0.15 to 0.30% by wt sodium alginate.

In yet another embodiment of the present invention, said beverage powder further contains 0.2 to 0.4% by wt of permitted food color.

In still another embodiment of the present invention, said beverage powder contains the food color is tartrazine.

The present invention also provides a process for preparing ready-to-dilute sugarcane juice beverage powder, said process comprises:

(a) soaking the sugarcanes in water containing 0.1% by wt. potassium meta bisulphite and 0.01% by wt. citric acid for 2–4 hours;

(b) cleaning the sugarcanes of step (a) and crushing the same to obtain sugarcane juice having concentration of 18–20° Brix;

(c) filtering the sugarcane juice of step (b) at 25–28° C.;

(d) adding 0.1 to 0.5% by wt. of conventional food preservatives to the filtered juice of step (c);

(e) emulsifying the juice of step (d) with 5 to 15% by wt. gum acacia pulvis, 0.01 to 0.10% by wt. of a heteropolysaccharide and optionally 0.05 to 0.5% by wt. sodium alginate;

(f) homogenizing the emulsified juice of step (e) for 5 to 10 min at 2000–2500 psi pressure, (g) drying the homogenized juice of step (f) under vacuum, 550–600 mm Hg pressure at 50–70° C. for 10–20 hrs to obtain solid sugarcane candy/cake, (h) powdering the solid sugarcane candy/cake to a coarse grind to obtain a particle size of 0.6–0.8 mm under dehumidified conditions, and (i) adding 1 to 2% by wt. of conventional anti-caking agents to powdered sugarcane candy/cake of step (h) to obtain sugarcane juice beverage powder.

In an embodiment of the present invention, wherein in step (b) the sugarcanes are washed with plain water before being crushed.

In another embodiment of the present invention, wherein in step (b) the sugarcanes are crushed using mechanical devices.

In yet another embodiment of the present invention, wherein in step (c) the sugarcane juice is filtered by centrifuging at 2000–2500 rpm.

In still another embodiment of the present invention, the food preservative is citric acid.

In a further embodiment of the present invention, wherein in step (d) 0.2 to 0.4% by wt. of a permitted food color is optionally added to the sugarcane juice.

In one more embodiment of the present invention, the food color is tertrazine.

In one another embodiment of the present invention, wherein before step (e) the sugarcane juice may be optionally concentrated to a solids content of 40–50° Brix.

In an embodiment of the present invention, the sugarcane juice is concentrated using agitated thin film evaporator.

In another embodiment of the present invention, wherein in step (f) 0.03 to 0.07% by wt. of heteropolysaccharide is used.

In yet another embodiment of the present invention, wherein in step (f) 0.15 to 0.30% by wt. sodium alginate is used.

In still another embodiment of the present invention, wherein in step (g) the emulsified juice is homogenized using a homogenizer at a speed of 10000 to 15000 rpm.

In a further embodiment of the present invention, wherein in step (h) the homogenized juice is dried with a tray load of 5–6 L/m².

The process for the preparation of sugarcane juice powder is illustrated in the flow chart given in FIG. 1.

The novelty of the process lies in the combined manner in which critical steps such as pre-treatment of the sugarcanes, homogenization of the juice with emulsifying and/or thickening agents, drying the emulsion under vacuum and coarse grinding the dried juice to obtain the sugarcane juice powder.

The following examples are given by way of illustration of the present invention and therefore should not be construed to limit the scope of the present invention.

EXAMPLE 1

10 Kg Sugarcanes were cleaned with water and the outer skin scraped manually with a knife. The scraped sugarcanes were soaked in 0.1% KMS solution mixed with 0.01% is citric acid in 100 L water for 2 hours. The canes were removed, drained off water, washed with fresh water and then crushed using a motorised crusher to obtain the juice. The spent canes were repeatedly passed through the crusher three more times and the total juice collected (4.3 L). The juice was subjected to centrifuigation using a Westphalia separator (2500rpm).

The yield of juice after centrifugation was 4.0 L (19° Brix; pH, 5.6; viscosity, 12.5 cps). The juice was mixed with 0.25% citric acid. The pH of the juice at this stage was 3.8. The preserved juice was thoroughly homogenised with gum acacia pulvis (5.0%) and a heteropolysaccharide (0.05% w/v), the viscosity of the juice being 18.0 cps. The homogenization was carried out using an Ultra Turrax T 25, IKA Werke, Germany. The emulsion was then evenly spread in aluminium trays lined with a high density polyethylene sheet at the rate of 5.5 L/m² and placed inside the vacuum shelf dryer (Stokes, England). The drying was carried out at 65° C. for 12 hrs under a vacuum of 600 mm Hg to get the yield of 300 g. The dried material was removed from the HDPE sheets, coarse ground to a particle size of 0.8 mm using a Waring blender in a dehumidified chamber and the juice powder was incorporated with tricalcium phosphate at a concentration of 1.0% and packed in aluminium foil laminatelpolyester poly pouches and sealed. The product on reconstitution with water at a concentration of 30% gave rise to a sugarcane juice beverage.

EXAMPLE 2

35 Kg Sugarcanes were cleaned with water and the outer skin scraped manually with a knife. The scraped sugarcanes were soaked in 50 L water containing 50 g KMS and 5 g citric acid for 4 hours. The canes were drained off water, washed with fresh water and then crushed to obtain 14 L juice [14° Brix]. The juice was centrifuged, and the clear juice [8.5 L] was mixed with citric acid (0.25%) and concentrated using a thin film evaporator to 3.3 L of 46° brix. The concentrated juice was thoroughly homogenised with gum acacia pulvis (8.5%), sodium alginate (0.25%) and tartrazine (280 ppm) and the pH of the juice was 3.9. The homogenization was carried out using an Ultra Turrax T 25, IKA Werke, Germany. The emulsion was then evenly spread in aluminium trays lined with a high density polyethylene sheet at the rate of 5.5 L/m² and placed inside the vacuum shelf dryer (Stokes, England). The drying was carried out at 65° C. for 12 hrs under a vacuum of 600 mm Hg to get the yield of 2.22 kg of the powder. The dried material was removed from the HDPE sheets, coarse ground to a particle size of 0.6 mm using a waring blender in a dehumidified chamber and the juice powder was incorporated with an anti-caking agent such as silicon dioxide at a concentration of 2.0% and packed in aluminium foil lamninate/polyester poly pouches and sealed. The product on reconstitution with water at a concentration of 10% gave rise to a sugarcane juice beverage.

What is claimed is:

1. A ready-to-dilute sugarcane juice beverage powder containing 80 to 95% by wt. dry sugarcane juice, 5 to 15% by wt. acacia pulvis, 0.01 to 0.10% by wt. of a heteropolysaccharide, 1–2% by wt. of one more anti-caking agents and 0.1 to 0.5% by wt. of food preservatives and optionally 0.05 to 0.5% by wt. sodium alginate.

2. A ready-to-dilute sugarcane juice beverage powder as claimed in claim 1, wherein said beverage powder contains 0.03 to 0.07% by wt. of heteropolysaccharide.

3. A ready-to-dilute sugarcane juice beverage powder as claimed in claim 1, wherein said beverage powder contains 0.15 to 0.30% by wt. sodium alginate.

4. A ready-to-dilute sugarcane juice beverage, powder as claimed in claim 1, wherein said beverage powder further contains 0.2 to 0.4% by wt. of food color.

5. A ready-to-dilute sugarcane juice beverage powder as claimed in claim 4, wherein said beverage powder contains the food color is tartrazine.

6. A process for preparing ready-to-dilute sugarcane juice beverage powder, said process comprises:
   (a) soaking sugarcanes in water containing 0.1% by wt. potassium meta bi-sulphite and 0.01% by wt. citric acid for 2–4 hours;
   (b) cleaning the sugarcanes of step (a) and crushing the same to obtain sugarcane juice having a concentration of 18–20° Brix;
   (c) filtering the sugarcane juice of step (b) at 25–28° C.;
   (d) adding 0.1 to 0.5% by wt. of food preservatives to the filtered juice of step (c);
   (e) emulsifying the juice of step (d) with 5 to 15% by wt. gum acacia pulvis, 0.01 to 0.10% by wt. of a heteropolysaccharide and optionally 0.05 to 0.5% by wt. of sodium alignate;
   (f) homogenizing the emulsified juice of step (e) for 5 to 10 min at 2000–2500 psi pressure,
   (g) drying the homogenized juice of step (f) under vacuum, 550–600 mm Hg pressure at 50–70° C. for 10–20 hrs to obtain solid sugarcane candy/cake,
   (h) powdering the solid sugarcane candy/cake to a coarse grind to obtain a particle size of 0.6–0.8 mm under dehumidified conditions, and
   (i) adding 1 to 2% by wt. of anti-caking agents to powdered sugarcane candy/cake of step (h) to obtain sugarcane juice beverage powder.

7. A process as claimed in claim 6, wherein in step (b) the sugarcanes are washed with plain water before being crushed.

8. A process as claimed in claim 6, wherein in step (b) the sugarcanes are crushed using mechanical devices.

9. A process as claimed in claim 6, wherein in step (c) the sugarcane juice is filtered by centrifuging at 2000–2500 rpm.

10. A process as claimed in claim 6, wherein in the food preservative is citric acid.

11. A process as claimed in claim 6, wherein 0.2 to 0.4% by wt. of a food color is added to the sugarcane juice in step (d).

12. A process as claimed in claim 11, wherein the food color is tertrazine.

13. A process as claimed in claim 6, wherein before step (e) the sugarcane juice is concentrated to a solids content of 40–50° Brix.

14. A process as claimed in claim 13, wherein in the sugarcane juice is concentrated using agitated thin film evaporator.

15. A process as claimed in claim 6, wherein in step (e) 0.03 to 0.07% by wt. of heteropolysaccharide is used.

16. A process as claimed in claim 6, wherein in step (e) 0.15 to 0.30% by wt. sodium alginate is used.

17. A process as claimed in claim 6, wherein in step (f) the emulsified juice is homogenized using a homogenizer at a speed of 10000 to 15000 rpm.

18. A process as claimed in claim 6, wherein in step (g) the homogenized juice is dried with a tray load of 5–6 L/m$^2$.

* * * * *